United States Patent [19]

Johnson et al.

[11] 4,409,256

[45] Oct. 11, 1983

[54] SOYMILK PROCESS

[75] Inventors: Lawrence A. Johnson, College Station, Tex.; William J. Hoover; Charles W. Deyoe, both of Manhattan, Kans.

[73] Assignee: The Edlong Corporation, Elk Grove Village, Ill.

[21] Appl. No.: 249,717

[22] Filed: Mar. 13, 1981

[51] Int. Cl.[3] ........................... A23L 1/20; A23L 2/38
[52] U.S. Cl. ................................... 426/598; 426/634; 426/656; 426/471
[58] Field of Search ......................... 426/598, 634, 656

[56] References Cited

U.S. PATENT DOCUMENTS

| | | | |
|---|---|---|---|
| 1,082,118 | 12/1913 | Gossel | 426/598 |
| 1,444,812 | 2/1923 | Thevenot | 426/598 |
| 4,041,187 | 8/1977 | Nelson et al. | 426/598 |
| 4,194,018 | 3/1980 | Hodel et al. | 426/598 X |
| 4,241,100 | 12/1980 | Wakana et al. | 426/598 |

FOREIGN PATENT DOCUMENTS 53-66465  6/1978  Japan .................................. 426/598

OTHER PUBLICATIONS

Nelson, A. I. et al., "Illinois Process for Preparation of Soymilk", J. Food. Sc., vol. 41, (1976), pp. 57-61.

*Primary Examiner*—Robert A. Yoncoskie
*Attorney, Agent, or Firm*—Richard E. Alexander

[57] ABSTRACT

This invention relates to a process for making a soybean-based milk analog or soymilk and food products prepared therefrom.

The process involves the comminuting of whole soybeans having the hulls thereon, forming a slurry of the comminuted soybeans, simultaneously initiating the inactivation of trypsin inhibitor and lipoxygenase without fixing protein bodies or substantially denaturing the soybean protein, confining the heated slurry until the trypsin inhibitor activity is reduced to a desired value, cooling the slurry, and separating the hulls from the slurry to recover the desired product.

The resulting soymilk is an aqueous preparation of the soybean which exhibits minimal destruction of essential amino acids, enhanced nutritional value, maximal retention, and thus increased yield of soybean solids including lipid and protein, optimal inactivation of trypsin inhibitors, reduced chemical browning, and enhanced flavor and palatability along with prolonged storage life. The process is characterized by the instantaneous heat transfer through direct infusion of steam into the slurry.

6 Claims, No Drawings

SOYMILK PROCESS

BACKGROUND OF THE INVENTION

The ever enlarging gap between world food supply and world demand for high quality food products continues, and has in the recent past and will continue in the future to force shifts from animal to vegetable sources of protein for human nutrition. Soy-based milk analogs are known in the prior art and have been shown to have potential in improving world-wide nutrition, particularly in less well developed countries. In this country, soybeans have been grown primarily for their oil content, the meal residue being used as livestock feed; only 3 to 5 percent of the annual domestic soybean crop is used for direct human nutrition. The largest domestic market for direct human use has been for milk substitutes for infants allergic or hypersensitive to bovine milk. Soy products are also currently used in a variety of applications including protein fortification and enhancement of functional properties in baked products, texturized imitation food products, the extension of comminuted meat products, and the fortification of breakfast cereals and beverages.

FLAVOR PROBLEMS

Although the functional and nutritional benefits of soy products have been demonstrated in numerous human food applications, the utilization of soybeans in non-Oriental food consumption patterns has been limited due to the presence in those soy products of biologically active components of the soybean and enzymes which catalyze the oxidation of fatty acids having conjugated carbon-carbon double bonds. The latter enzyme causes rapid flavor deterioration when raw soy flour is slurried or when soybeans are ground in water. It is largely this flavor problem which has precluded the extensive use of soy products outside the Orient. Numerous methods have been devised to reduce this off-flavor development; however these methods also reduce yields of soymilk, dispersable endogenous protein content and the functional properties of the protein generally, and the nutritional qualities of the soymilk occasionally. These processes have the further disadvantage of requiring large amounts of installed energy-intensive capital and a great deal of technical expertise in operation, and generate large amounts of waste water having high biological or chemical oxygen demand.

The extent to which undesirable flavor components are inherent in the soybean itself and the extent to which such flavors are produced during processing has not yet been fully defined. It is generally accepted, however, that comminution of the intact soybean during processing does in fact generate significant off-flavors, particularly when previously nonheat-treated soy particles contact water.

It is now generally recognized that the typical raw soybean flavor which results upon maceration of the bean is decreased by either moist or dry heat application preceding maceration, and this because the enzyme lipoxygenase (linoleate oxygen oxidoreductase, EC 1.13.11.12) is heat sensitive. Primary oxidation products of both lipoxygenase-catalyzed reactions and autoxidation are thought to involve the formation of nine- and thirteen-hydroperoxide isomers of linoleic acid, in which the hydroperoxide oxygen derives from the gaseous phase. These hydroperoxides in turn undergo a variety of enzymatic and nonenzymatic reactions to produce volatile carbonyls and organic acids which have very low flavor thresholds. Once the off-flavor is produced it is not currently possible to eliminate it entirely or to mask it. It has been further reported that the off-flavor caused by lipoxygenase activity, which results when the cell tissue of soybean cotyledons is disrupted in the presence of even a small amount of moisture, develops almost instantaneously. It is generally assumed that this enzymatic activity is minimal at the usual moisture content of dry merchantable soybeans before grinding or comminution.

Soymilk has been prepared for hundreds of years in the Orient by a traditional water-extraction method which involves soaking the soybeans in water for several hours, draining, grinding with additional water, filtering to remove the insoluble residue and cooking the filtrate for about thirty minutes. This process continues to be practiced today although it produces a soymilk which has a flavor to which Occidentals have not become accustomed. All efforts to transplant this process to developing third world cultures have failed largely as a result of the unacceptable flavor of this liquid product. It is generally recognized that the traditional Oriental method allows extensive lipid oxidation by lipoxygenase; grinding the bean in water produces ideal conditions for lipoxygenase activity (hydration, increased surface area for water contact, fat dispersion, abundance of oxygen, and optimum pH and temperature for enzyme activity). The filtered water extract is heat treated to pasteurize the extract and to partially reduce the off-flavor produced; it is only in this latter step that lipoxygenase is inactivated, far too late to preclude off-flavor development. In addition, some soluble protein is insolubilized by the heat, forming a surface scum or a precipitate which must be removed before bottling.

Dry-heat roasting of the whole unbroken soybean has been used to inactivate lipoxygenase and trypsin inhibitor prior to processing soybeans into numerous derivative products.

It was found that while dry heat at 200° F. for thirty minutes greatly reduced enzyme activity, protein extractability yield is also greatly reduced, a nutty flavor distinguishable from that of lipid oxidation products develops, a chalky texture in the extract is produced and the color darkens, all of which are undesirable.

The traditional soaking of whole soybeans at ambient temperature prior to wet grinding presumably tenderizes the beans, facilitates comminution or grinding and enhances extraction of solids. Yet, despite the fact that soaking is nearly always used, there is no clear demonstrated advantage to this pretreatment. In fact, lipoxygenase activity has been shown to occur, although at a low level, during this period even though soybean seed coat remains intact; at a very minimum, the soaking process brings the soybean lipoxygenase to a potentially active state from which the enzyme becomes instantly active once the soybean seed coat is disrupted.

Blanching of whole soybeans prior to grinding very severely and permanently "sets" the protein bodies therein, and denatures protein and therefore prevents solubilization of the soy proteins, allowing a yield of soybean solids including lipid and protein in the aqueous extract only much lower than soymilks prepared by other methods when centrifuged at 1000 g.

REDUCED YIELD

Ordinarily, the application of heat to effect inactivation of lipoxygenase and of antinutritional factors such as trypsin inhibitors is common to all known processes for the preparation of aqueous soybean extracts, but, major soy proteins are also denatured and rendered insoluble by heating in prior processes. Generally, the yield of solids in soymilk extracts decreases as a function of the extent and severity of the heat treatment. As a benchmark, approximately 62 to 65 percent of the whole soybean is recovered in centrifuged or filtered soymilk made by the traditional Oriental process and most common particles today. (Compare with Table 1 which shows the yield of the conventional processes compared with the process of this invention.)

Since blanching prior to grinding drastically reduces the solids and protein recovery of conventionally processed soybeans, the art sought to overcome the deficiencies of prior processes and to also provide a stable aqueous dispersion of soybean protein and other solids. U.S. Pat. Nos. 3,901,978 and 4,041,187 allegedly teach a process for the preparation of a bland, stable aqueous dispersion of whole soybeans through soaking, blanching to inactivate the lipoxygenase enzyme, comminuting the blanched soybeans and forming therefrom a slurry in water, and homogenizing the slurry in multiple steps with concomitant heat treatment. According to the alleged teachings of these patents, even undehulled soybeans can be used whereby 99 percent of the soybean solids become dispersed in the uncentrifuged soymilk. The process taught in the reference patents is known to those skilled in the art as the Illinois Process.

A study undertaken to directly compare the Illinois Process, in which blanching or moist heating of the intact soybean is accomplished before soybean disruption, with other processes known in the art in which the soybean is heated only during or only after disruption, is reported in "Soy Milk; a Comparison of Processing Methods on Yields and Composition", *Journal of Food Science*, Volume 43, pages 349–353 (1978). That comparative study demonstrated that the Illinois Process, after centrifugation (a step not taught or utilized in either patent) of the final homogenate at 642×G provided a yield of soymilk, i.e., the weight of soymilk or supernate after centrifugation of the final homogenate of only 59.2 percent; the total yield of soymilk solids, i.e., the weight of solids in the soymilk (supernatant) divided by the total weight of solids in the cooked slurry was found to be only 48.8 percent. (Compare with Table 1 showing results of the process of this invention.)

An object of this invention is to provide a process which provides a remarkably stable soy beverage with improved yields.

An object of this invention is to provide a process which provides a remarkably stable soy beverage with improved yields and less chemical browning while achieving greater than 90% inactivation of trypsin inhibitor.

An object of this invention is to provide a process which provides a remarkably stable soy beverage with improved yields and less chemical browning while achieving greater than 90% inactivation of trypsin inhibitor and having a thiobarbituric acid value of less than 15 p.p.m. basis moisture-free solids.

An object of this invention is to provide a process which provides a remarkably stable soy beverage with improved yields and less chemical browning while achieving greater than 90% inactivation of trypsin inhibitor having a thiobarbituric acid value of less than 15 p.p.m. basis moisture-free solids which avoids denaturing of the protein or setting of protein bodies and provides prolonged storage life.

An object of this invention is to provide a process which eliminates the need for energy intensive capital and technical expertise in preparation of soy products.

Yet another object of this invention is to provide a stable organoleptically acceptable product.

DESCRIPTION OF THE PREFERRED EMBODIMENTS

The discovery which constitutes the present invention is that the infusion of live steam into an aqueous slurry of comminuted whole soybeans, preferably, practically, instantaneously and the containment of such steam-injected slurry for a time sufficient to inactivate at least nine-tenths of the trypsin inhibitor activity and of all lipoxygenase, results in a nutritionally and organoleptically superior soymilk and enhanced yields of a stable dispersion of endogenous soybean solids and protein. By whole soybeans, here and throughout the specification, is meant soybeans with the hull intact.

The soymilk of this invention is an aqueous preparation of the soybean which exhibits:
  (1) minimal destruction of essential amino acids;
  (2) maximal retention with enhanced nutrient value and thus increased yield of soybean solids protein;
  (3) optimal inactivation of trypsin inhibitors and reduced chemical browning; and
  (4) enhanced flavor and palatability along with prolonged storage life.

Any of the known varieties of soybeans can be used in the practice of this invention provided that they are of merchantable quality passing without objection in the trade. For the practice of this invention, it is preferable that the soybeans be cleaned by conventional air aspiration means and mechanically classified to remove detritus such as stalks, twigs and rocks.

Whole soybeans, with hulls intact, are ground or comminuted in a suitable fashion. Comminuted particle sizes are sufficient for this purpose when the particles of comminuted soybeans pass through a screen having an opening of up to 0.200 millimeters, more preferably the openings being up to 0.125 millimeters. The comminuted whole soybeans or soy flour is then combined with water. Water and comminuted soybeans may be placed in the receiving end of an auger feeder of sufficient size to allow discharge therefrom of a homogenous slurry of the comminuted soybean to the inlet end of a positive-displacement pump such as a Moyno pump.

The rate of volumetric displacement of the Moyno pump is regulated by a variable speed reducer. Upon discharge from the Moyno pump, the slurry is fed under pressure greater than that of the infusing steam into a high shear mixing device such as a hydroheater valve in which an internal combining tube of the hydroheater valve diverts the slurry to the periphery of the steam infusion nozzle in such manner that the slurry envelops in a concentric manner the steam flowing into the combining valve.

As the preferred embodiment the process of the invention, the steam infusion of the slurry is accomplished under conditions which provide high shear treatment of the slurry and nearly instantaneous heating of the slurry, providing extraordinary turbulence and shear so as to contact each comminuted soybean particle with superheated steam instantly upon admission to the containment vessel. The rate of heat transfer and absorption into each particle is increased, thereby preventing temperature stratification, and providing rapid and uniform heat treatment of each particle.

Preferably after the mixture of the infused steam and soybean slurry, the infused slurry is discharged directly into a holding device. The length of residence time of the steam-infused slurry within the holding device is a function of the volume of that tube. Upon passing through the back pressure control valve at the terminus of the holding tube, the superheated steam-infused soybean slurry is (1) flashed to a holding vessel maintained at or below ambient atmospheric pressure if the process is conducted batchwise; or (2) conducted to a heat exchanger if the process is conducted in a continuous manner.

While resident within the receiving holding vessel or cooling heat exchanger to which the infused soy slurry is discharged, the slurry is also rapidly cooled to less than about 140° F. and preferably to less than about 120° F.

Preferably, the soy slurry is cooled from its flash discharge temperature of 212° F. to less than 120° F. in about 120 seconds and preferably in less than about 90 seconds. This rapid cooling is necessary to prevent the browning caused by the further degradation of heat-labile amino acids and peptides and oligopeptides containing those amino acids. The temperature above which browning occurs shall be referred to as "the browning temperature". The cooling also functions to decrease the rate of formation of Maillard condensation products between heat-denatured proteins or peptides and various carbohydrates, thus avoiding undue browning discoloration of the soymilk indicative of loss of availability of the Maillard reaction condensed proteins, peptides or amino acids to human digestive and absorbative capabilities.

It is known in the art that the protein efficiency ratio of soymilks containing less than 10 percent of original trypsin inhibitor activity may be predicted using the Hunter L value which measures the lightness—darnkess of a color, higher values indicating lighter color and less browning, lower values indicating a darker color and more browning. Browning in soymilks is indicative of protein and amino acid destruction. The amino acids methionine, cysteine, lysine, serine and threonine are found in soymilk and are known to be susceptible to heat damage. Since these amino acids are known to be the first growth rate limiting amino acids, their destruction in any protein product greatly reduces the protein efficiency ratio of that product. The empirical relationship known to the art for determining the protein efficiency ratio (PER) of soymilks as a function of the Hunter L value, and thus as a funcion of the extent of browning, is given by the simple arithmetic equation:

$$PER = 0.027H - 0.04,$$

where H equals the Hunter L value.

This color measuring test has been found very useful in the evaluation of relative extents of amino acids destruction.

The hydroheater valve for effecting the steam infusion under conditions of extreme turbulence and shear can be any commercially available such valve, such as that made by Hydro-Thermal Corporation, Milwaukee, Wis. The materials of construction of all of the components of this rapid hydration hydrothermal steam infusion cooking system are such as to be compatible with the handling of lipid-containing foods, that is, no metals or alloys thereof which might leach copper or iron or other heavy metals capable of catalyzing the oxidation of fatty acids are permitted in any of the materials of construction of the entire system. Preferably, the entire system is constructed of stainless steel.

It is further generally agreed that the nutritional quality of heat-treated soybeans or aqueous preparations thereof is inversely proportional to the trypsin inhibitor content; that destruction of at least nine-tenths of native trypsin inhibitor activity is essential to the retention of optimal nutritional quality of the soy protein; that the nutritional quality of the protein increases with heat treatment until a point is reached where significant amino acid degradation occurs. It is also known that the extent to which trypsin inhibitors are inactivated by heat is a direct function of temperature, of duration of heat treatment, of particle size, of pH, and of moisture content. The proper heat treatment of soy flour results in improved nitrogen and amino acid absorption in rats, as measured by the protein efficiency ratio assay, in direct proportion to the extent of heat destruction of trypsin inhibitors. Trypsin inhibitor content is generally taken as a good measure of the adequacy of heat treatment, provided that heating is not continued beyond the time required for 90 percent destruction of trypsin inhibitor activity or the point where substantial destruction of heat-labile essential amino acids occurs. It is also known that the rate of inactivation of trypsin inhibitors increases with more alkaline pH values, and that the rate of inactivation follows zero order kinetics at pH 6.8 and first order kinetics at pH 9.9 when using conventional heat-treating or retorting techniques.

Any suitable means for determining trypsin inhibitor activity may be used. In one means, to determine trypsin inhibitor activity, approximately 4.0 g of soymilk is diluted to 100 ml with distilled water and centrifuged at 30,000 g for 30 minutes at 5° C. The supernatant is diluted from 1:1 to 1:4, depending upon trypsin inhibitor activity. Trypsin inhibitor activity is assayed by the procedure of Swartz et al. (1977) *Journal of Biological Chemistry* 252:8105.

In addition to providing a level of inactivation of trypsin inhibitors to well below the maximal level thought acceptable in the art, the process of the instant invention is remarkably and effective in inactivating soybean lipoxygenase, thereby providing a bland beverage.

It has been found in the practice of the process of this invention that the rate of increase in the concentration of fatty acid hydroperoxides and resultant oxidation products increases in comminuted soybean slurries very rapidly, nearly doubling in the sixty second period following soybean disruption or comminution.

Thus in other embodiments of this invention the formation of oxidation products may be minimized by:
 (a) rapidly heating the slurry shortly after formation;
 (b) forming the slurry in a vacuum;
 (c) sparging the slurry soon after formation with nitrogen or any other inert non-toxic, non oxygen-containing gas;
 (d) adjusting the pH to below 3 or greater than 9.5; and (e) slurrying with hot water (slurry temperature 780° C).

The foregoing we shall refer to collectively as means for preventing the substantial oxidation of the slurry.

The exemplary material is provided below to enhance an understanding of this invention, but is not to be construed to limit in any way the scope of the inventions being defined in the appended claims.

EXAMPLE 1

This Example relates to comminuting whole soybeans having the hulls thereon for use in the process of this invention. Seed grade Columbus soybeans from the 1976 crop, 99 percent pure with 88 percent germination, and with protein, crude free fat and moisture contents respectively of 37.9 percent, 21.9 percent and 8.1 percent are used in these experimental evaluations. The whole soybeans are ground in a hammermill through a 0.125 millimeter opening screen, one part of the comminuted soybeans being slurried in four parts water. In varying the slurry water temperature, it is found that the use of water at 9° C. does not materially reduce the rate of lipid oxidation over the first five minutes of slurry time, but does reduce the concentration of 2-thiobarbituric acid reactive materials after 70 minutes of slurry time to about one-half the value found in the use of slurry water at 25° C. It is further found that the slurry water temperature has to be increased to about 70° C. before lipid oxidation is substantially reduced, and that at 80° C. the rate of lipid oxidation is nearly zero. Further, the temperature optimum for maximum rate of generation of 2-thiobarbituric acid reactive materials is found to be about 25° C., which is also the temperature optimum for lipoxygenase activity reported in the art.

The whole seed-grade Columbus soybeans are then slurried in comminuted form in tap water at a ratio of four parts water to one part soy flour. The slurry is formed and transferred to a modified Hydro-Thermal Corporation hydrothermal jet cooker with hydro-heating valve and a downstream holding tube, back-pressure controlled. The soy slurries are divided into four batches and processed at cook temperatures of 250° F., 270° F., 290° F. and 310° F. (121° C., 132° C., 143° C. and 154° C.,) under continuous operation and at times indicated in Table 2. Upon discharge from the hydrothermal jet cooker to ambient atmospheric pressure, the flashed product is cooled within 5 seconds to 110° F. or less in an ice bath. A control sample, using the standard Oriental process, is prepared by cooking identically comminuted soybeans in the conventional manner in a Groen kettle at 210° F. (99° C.) in which cooking time started upon contact of the soy flour with boiling water and in which approximately 30 seconds were required to re-establish the cooking temperature after addition of the comminuted soybeans. During cooking the control sample is continuously agitated and upon completion of cooking is cooled in an ice bath.

Upon cooling, all samples are adjusted to 10 percent solids after initial determination of hydrothermally cooked slurry solids, and aliquot portions of each of the samples were then centrifuged at 2,700 rpm under 1,050 g centrifugal force for five minutes. The soymilk supernate is decanted and residual material weighed. Yields of the fractions and their respective solids and protein contents, and in the case of the supernate, the residual trypsin inhibitor activity as a percent of the original activity, and the color as measured by the Hunter L value are determined. The results of the comparative evaluations are shown in Table 1. As can be seen from Table 1, longer cooking times permit lower temperature use while shorter cooking times require higher temperatures. Thus, cooking time and temperature are inversely related.

TABLE 1

| Cooking Conditions | | Soymilk | | | | |
|---|---|---|---|---|---|---|
| Temperature | Time (sec) | Fraction Yield (%) | Solids Yield (%) | Protein Yield (%) | Residual TI (%) | Color (Hunter L) |
| | | Control | | | | |
| 99° C. (210° F.) | 5 | 75.3 | 63.8 | 76.9 | 70.0 | 77.1 |
| Control- | 300 | 74.7 | 63.3 | 75.6 | 23.2 | 76.9 |
| Oriental | 900 | 73.9 | 62.7 | 75.1 | 11.5 | 76.2 |
| Process | 1800 | 73.7 | 62.9 | 75.0 | 9.6 | 75.2 |
| | 2700 | 72.9 | 61.8 | 74.2 | 8.0 | 73.6 |
| | 3600 | 72.1 | 61.2 | 73.2 | 7.6 | 73.0 |
| | | Invention | | | | |
| 121° C. (250° F.) | 5 | 76.4 | 65.9 | 78.1 | 73.3 | 78.3 |
| Steam | 19 | ND | ND | ND | 57.0 | ND |
| Infusion | 55 | ND | ND | ND | 21.3 | ND |
| Process | 85 | 74.9 | 65.6 | 77.0 | 13.2 | 79.0 |
| | 145 | 71.0 | 63.4 | 74.4 | 11.6 | 78.5 |
| | 205 | 72.9 | 64.6 | 74.9 | 8.9 | 78.2 |
| | 265 | 73.8 | 66.0 | 76.2 | 8.0 | 77.9 |
| 132° C. (270° F.) | 5 | 75.3 | 64.8 | 75.8 | 72.0 | 78.3 |
| Steam | 58 | 72.6 | 64.1 | 75.0 | 13.0 | 80.0 |
| Infusion | 88 | 69.9 | 63.4 | 72.0 | 9.4 | 79.4 |
| Process | 148 | 74.9 | 69.9 | 76.2 | 7.0 | 78.0 |
| | 208 | 81.7 | 76.7 | 82.4 | 6.5 | 77.0 |
| | 268 | 87.2 | 83.3 | 87.2 | 6.0 | 76.0 |
| 143° C. (290° F.) | 5 | 74.0 | 63.6 | 75.5 | 71.8 | 78.2 |
| Steam | 9 | ND | ND | ND | 53.0 | 79.3 |
| Infusion | 30 | 69.4 | 61.2 | 69.0 | 14.8 | 79.1 |
| Process | 60 | 84.3 | 79.8 | 85.1 | 8.6 | 78.1 |
| | 90 | 89.0 | 84.7 | 89.3 | 7.7 | 76.7 |
| | 150 | 86.1 | 85.2 | 82.7 | 6.5 | 74.2 |
| | 210 | 85.3 | 78.7 | 82.0 | 5.6 | 73.0 |
| | 270 | 84.2 | 76.8 | 80.0 | 4.4 | 71.5 |
| 154° C. (310° F.) | 5 | 76.0 | 65.8 | 77.7 | 71.1 | 79.0 |

TABLE 1-continued

Yield and Quality of Soymilk Processed by Steam-Infusion Cooking at pH 6.7

| Cooking Conditions | | Soymilk | | | | |
|---|---|---|---|---|---|---|
| Temperature | Time (sec) | Fraction Yield (%) | Solids Yield (%) | Protein Yield (%) | Residual TI (%) | Color (Hunter L) |
| Steam | 11 | 72.9 | 64.6 | 76.4 | 32.5 | 79.8 |
| Infusion | 25 | 88.2 | 84.8 | 85.8 | 10.9 | 79.0 |
| Process | 34 | 90.2 | 86.0 | 89.4 | 8.5 | 77.4 |
| | 64 | 89.1 | 83.4 | 86.3 | 6.1 | 74.4 |
| | 94 | 87.0 | 79.1 | 80.5 | 5.1 | 72.9 |
| | 154 | 84.7 | 73.3 | 78.1 | 4.7 | 70.5 |
| | 214 | 81.5 | 71.9 | 73.2 | 2.9 | 67.2 |

ND denotes not determined

EXAMPLE 2

The procedure of Example 1 is repeated except that samples cooked at a slurry pH of 9.5 were neutralized with 2 N HCl to pH 6.6 immediately after cooking and cooling. The results are reported in Table 2 below.

TABLE 2

Yield and Quality of Soymilk Processed by Steam-Infusion Cooking at pH 9.5

| Cooking Conditions | | Soymilk | | | | |
|---|---|---|---|---|---|---|
| Temperature | Time (sec) | Fraction Yield (%) | Solids Yield (%) | Protein Yield (%) | Residual TI (%) | Color (Hunter L) |
| | | Control | | | | |
| 99° C. (210° F.) | 5 | 78.5 | 66.5 | 79.1 | 45.6 | 76.2 |
| Control- | 300 | 74.6 | 65.9 | 75.3 | 5.5 | 73.5 |
| Oriental | 900 | 72.9 | 64.8 | 77.2 | 3.0 | 70.8 |
| Process | 1800 | 74.2 | 67.6 | 73.9 | 1.8 | 67.1 |
| | 2700 | 74.4 | 66.6 | 73.9 | 0.9 | 65.8 |
| | 3600 | 73.7 | 63.7 | 73.9 | Trace | 63.6 |
| | | Invention | | | | |
| 121° C. (250° F.) | 5 | 79.7 | 69.0 | 76.7 | 47.5 | 77.2 |
| Steam | 25 | 74.3 | 64.8 | 74.9 | 12.8 | 77.2 |
| Infusion | 40 | 74.8 | 65.8 | 75.7 | 9.0 | 77.2 |
| Process | 85 | 72.0 | 63.0 | 71.9 | 7.2 | 76.1 |
| | 145 | 73.2 | 65.4 | 73.0 | 5.9 | 74.9 |
| | 205 | 76.7 | 70.1 | 76.7 | 4.1 | 73.6 |
| | 265 | 81.3 | 76.2 | 82.0 | 3.8 | 71.1 |
| 143° C. (290° F.) | 5 | 78.9 | 68.7 | 79.8 | 27.2 | 77.3 |
| Steam | 9 | 73.3 | 63.5 | 74.2 | 15.1 | 74.5 |
| Infusion | 22 | 74.9 | 67.8 | 76.6 | 11.9 | 75.9 |
| Process | 30 | 80.0 | 74.6 | 80.8 | 8.3 | 74.9 |
| | 60 | 81.6 | 76.7 | 80.1 | 6.0 | 72.6 |
| | 90 | 86.1 | 82.1 | 84.5 | 3.0 | 69.4 |
| | 150 | 89.4 | 86.0 | 87.5 | Trace | 66.6 |
| | 210 | 90.5 | 87.0 | 87.9 | Trace | 64.3 |

COMPARISON OF EXAMPLES 1 AND 2

It is noted that all inventive samples of Examples 1 and 2 exhibited an identical pattern in recovery of soybean solids in the milk fraction as a function of time and exposure to a given process temperature, namely, an initial decrease in yield at short times followed by a rapid increase to a maximal yield at intermediate times, and then a final decrease in yield at prolonged times. The pattern was consistent, with the point of maximal solids yield being directly dependent upon time and temperature. The process time for a maximum yield of solids is roughly halved for each 20° F. (11° C.) increase in temperature.

The great stability of the end product soymilk to be had in the practice of the instant process is believed to be brought about by the extensive shear and turbulence of the steam infusion process, short heat treatment at high temperature, the subsequent flashing to ambient pressure, and the rapid cooling to near ambient temperatures.

The samples processed at pH 9.5 provide patterns similar in solids yield recovery to those obtained in the samples processed at pH 6.7, with the exception that the time for arrival to a maximal solids and protein recovery is slightly higher at pH 6.7. It will readily be seen that generally, a processing at pH 9.5 reduced the cooking time for the production of equivalent yields of soymilk fraction, solids and protein.

It is clear from the results of Tables 1 and 2 that processing at pH 9.5 significantly increases the rate and the extent of chemical browning. The Hunter L value for all process times at 250° and 290° F. (121° and 143° C.) at pH 9.5 is significantly darker than comparable samples processed at pH 6.7. It is also clear that severe darkening occurred at 290° F. (143° C.) during long-time processing at pH 9.5. The results presented in Table 1 indicate much less chemical browning and consequently less amino acid destruction in high temperature, short time hydrothermal processing at neutral or near-neutral pH values than at alkaline values. It is further apparent from the results of Tables 1 and 2 that the kinetics of trypsin inhibitor inactivation are very much different than the kinetics of chemical browning.

Each of the samples evaluated and included in Tables 2 and 3 gave no indication of settling upon storage at 5° C. for a two-week period.

EXAMPLE 3

As in Example 1, whole seed-grade Columbus soybeans are ground in a hammermill through a 0.125 millimeter opening screen and are slurried in tap water in comminuted form at a ratio of four parts water to one part soy flour. The Hydro-Thermal hydroheating valve with downstream holding tube is used to process the soy slurry at a temperature of 310° F. (154° C.) for from 20 to 300 seconds at the inherent pH of the soybean, namely, pH 6.6 to 6.7. Again, upon discharge from the hydrothermal jet cooker, the flashed product is cooled to 110° F. or less in an ice bath. Upon cooling, the slurry is centrifuged at 2700 rpm under 1050 g centrifugal force for five minutes to remove the small portion of nonemulsified soybean solids, including the hulls. On a weight basis, the supernate is found to contain a minimum of 80 percent of the total soybean solids, in a soymilk representing recovery of at least 85 percent of the initial slurry, containing a minimum of 80 percent of the soy protein and between 7 and 9 percent of the original trypsin inhibitor activity. When spray-dried to less than about 7–8 percent moisture, the soymilk so prepared, provides a finely particulate, free-flowing, pale tan powder having exceptional organoleptic and functional properties. The soymilk may also be lyophilyzed to a comparable moisture content. This soy flour powder is bland and completely acceptable to health and natural-food advocates, has excellent water absorption and emulsifying properties, and is fully functional in baking, beverage, and confectionery applications for mammalian nutrition. The powdered product rehydrates readily and forms a stable aqueous emulsion or colloidal suspension at concentrations up to 50 percent by weight of water. Essentially all the lipid in the spray-dried product remains emulsified upon dissolution in water; no free fat separates from the aqueous layer.

With similar advantageous effect, as shown in Examples 2 and 3, the soy slurry of this example may be hydrothermally processed at temperatures higher or lower than 310° F. (154° C.), and for longer or shorter times than from 20 to 300 seconds, to yield a soymilk of identical quality although diminished in yield of total solids and protein when processed at temperatures lower than 310° F. in comparison to the slurry hydrothermally processed at 310° F. (154° C.) or higher for from 20 to 300 seconds.

EXAMPLE 4

The procedure of Example 3 is repeated but for the following modificatins:
(1) During the steps of soybean comminution and slurrying, means are used for preventing substantial oxidation of the slurry such as: the hammermill and the slurry forming auger are sparged with nitrogen; other inert, nontoxic and non oxygen-containing gas or gases may be used in place of nitrogen; the pH may be adjusted; a vacuum may be used; or the time between slurrying and heating minimized; or slurrying in hot water.
(2) Advantageously, the soymilk so prepared is found to contain lipid oxidation products as measured by the 2-thiobarbituric acid value with reference to total solids in the soymilk of less than 10 p.p.m. basis moisture-free solids; and
(3) Preventing substantial oxidation during slurrying advantageously allows recovery of a soymilk significantly decreased in concentration of fatty acid oxidation products.

EXAMPLE 5

The following soymilk is prepared as in Example 3, varying only temperature and time to provide a maximum of 7 to 8 percent residual trypsin inhibitor activity. The results are reported in Table 3.

TABLE 3

Properties of Soymilk Processed by Hydrothermal Cooking at Various Temperatures to Inactivate 92–93% of the Original TI Activity

| Cooking Conditions | | | Soymilk | | | |
|---|---|---|---|---|---|---|
| pH | Temperature | Time (sec) | Fraction Yield (%) | Solids Yield (%) | Protein Yield (%) | Color (Hunter L Value) |
| 6.7 | 99° C. (210° F.) | 3600 | 72.1 | 61.2 | 73.2 | 73.2 |
| 6.7 | 121° C. (250° F.) | 280 | 74.1 | 66.4 | 76.6 | 77.6 |
| 6.7 | 132° C. (270° F.) | 165 | 77.1 | 71.6 | 77.9 | 78.8 |
| 6.7 | 143° C. (290° F.) | 100 | 88.0 | 84.0 | 88.0 | 76.6 |
| 6.7 | 154° C. (310° F.) | 40 | 90.2 | 86.0 | 89.4 | 76.8 |
| 9.5 | 99° C. (210° F.) | 150 | 76.6 | 66.2 | 77.2 | 74.9 |
| 9.5 | 121° C. (250° F.) | 80 | 71.6 | 63.2 | 72.3 | 76.7 |
| 9.5 | 143° C. (290° F.) | 40 | 80.5 | 75.3 | 80.6 | 74.0 |

EXAMPLE 6

The product of Example 3, containing approximately 90.5 percent water, 4.0 percent protein, the remainder being lipids, salts, and flatulence causing carbohydrates such as stachyose and raffinose, is subjected to ultrafiltration. Any commercially available ultrafiltration equipment with a molecular weight cutoff for retentate of approximately 40,000 daltons and provided with conventional ultrafiltration membranes made of mixed cellulose acetates manufactured by Abcon. (Suitable ultrafiltration membranes can also be made of polysulfones. Other manufacturers include Romicon, Osmonics, Dorr-Oliver or De Danske Sukkerfabrikker for the ultrafiltration membranes suitably employed for this process.) Upon recirculation of the ultrafiltration retentate, there is obtained a liquid product containing between 15 percent and 40 percent solids by weight, of which solids approximately half is protein and half is lipid. Advantageously, the ultrafiltration retentate may be spray dried to a powder of less than 5 percent total moisture to insure its keeping qualities. Upon maintenance of aseptic technique during the ultrafiltration process, the ultrafiltration retentate remains essentially sterile. Upon assay of the retentate for carbohydrates, it is found that the spray-dried product contains approximately one-half the carbohydrate endogenous to the whole soybean. Further reductions in the content of carbohydrate may be had through the conventional process known in the art as diafiltration, in which deionized water is mixed with the ultrafiltration retentate to further dissolve salts and carbohydrates and allow their permeation through the ultrafiltration membrane without limiting the flux rate there through by concentration polarization.

Although this invention is described with a certain degree of particularity, it is understood that the present disclosure has been made only by way of example and that numerous changes in the details of equipment and the parameters of the process may be resorted to without departing from the spirit and the scope of the invention as hereinafter claimed.

What is claimed and sought to be secured by Letters Patent of the United States is:

1. A cooked soybean product in stable dispersion form having:
   (a) a yield of at least 70% of the whole soybean;
   (b) a Hunter L color value in excess of 70;
   (c) trypsin inhibitors inactivated to less than 10% of the trypsin inhibitors of whole soybeans;
   (d) a thiobarbituric acid assay of less than 15 p.p.m. TBA value on the basis of moisture free solids.

2. A cooked soybean product of spray-dried soymilk wherein said spray-dried soymilk:
   (a) is soluble in water to at least 50% on a weight basis;
   (b) forms a stable colloidal suspension;
   (c) has a Hunter L color value in excess of 70;
   (d) has trypsin inhibitors inactivated sufficiently to less than 10% of the trypsin inhibitors of whole soybeans;
   (e) has a thiobarbituric acid assay of less than 15 p.p.m. T.B.A. value basis moisture-free solids; and
   (f) remains a stable colloidal suspension when asceptically packaged.

3. A process for the manufacture of a soybean product from whole soybeans, said product consisting essentially of at least 70% or more of the whole soybean solids in a stable dispersion and containing trypsin inhibitor activity less than 10 percent than that found in whole soybeans with reference to total solids in said product, said process comprising:
   (a) dry comminuting whole soybeans at room temperature;
   (b) adding water to the dry comminuted soybeans to form an aqueous slurry containing substantially 10 to 25 percent by weight of said comminuted soybeans at room temperature;
   (c) quickly subjecting said slurry, shortly after formation, to steam infusion to minimize oxidation of the slurry, providing extreme turbulence and high shear to heat said slurry from room temperature to within a range of substantially 270° F. (121° C.) to 310° F. (154° C.) at a rate of at least substantially 30° F. (11.4° C. per second while confining said slurry within a vessel and holding said heated slurry for a time within a range of substantially 15–270 seconds, the time and temperature being inversely related;
   (d) rapidly cooling said slurry after heating to below the browning temperature of the slurry; and without further grinding constituting a soybean product in a stable dispersion.

4. The process of claim 3 wherein the soybean is dehulled before formation of an aqueous slurry.

5. The process of claim 3 wherein the soybean hulls are separated from the slurry after the slurry is cooled below the browning temperature.

6. A process for the manufacture of a soybean product from whole soybeans, said product consisting essentially of at least 80% or more of the whole soybean solids in a stable dispersion and containing trypsin inhibitor activity less than 10 percent than that found in whole soybeans with reference to total solids in said product, said process comprising:
   (a) dry comminuting whole soybeans at room temperature;
   (b) adding water to the dry comminuted soybeans to form an aqueous slurry containing substantially 10 to 25 percent by weight of said comminuted soybeans at room temperature;
   (c) quickly subjecting said slurry, shortly after formation, to steam infusion to minimize oxidation of the slurry, providing extreme turbulence and high shear to heat said slurry from room temperature to within a range of substantially 270° F. (121° C.) to 310° F. (154° C.) at a rate of at least substantially 30° F. (11.4° C.) per second while confining said slurry within a vessel and holding said heated slurry for a time within a range of substantially 20–270 seconds, the time and temperature being inversely releated;
   (d) rapidly cooling said slurry after heating to below the browning temperature of the slurry; and without further grinding constituting a soybean product in a stable dispersion.

* * * * *